March 21, 1967 L. H. COYKENDALL 3,310,037
VAPOR GENERATING APPARATUS
Filed Oct. 23, 1965 2 Sheets-Sheet 1

INVENTOR
Leon H. Coykendall
BY
ATTORNEY

# United States Patent Office 3,310,037
Patented Mar. 21, 1967

3,310,037
VAPOR GENERATING APPARATUS
Leon H. Coykendall, Wadsworth, Ohio, assignor to The Babcock & Wilcox Company, New York, N.Y., a corporation of New Jersey
Filed Oct. 23, 1965, Ser. No. 503,433
2 Claims. (Cl. 122—392)

This invention relates generally to fluid heating apparatus, and more particularly to vapor generating apparatus.

Conventional vapor generators usually include a number of heat exchangers serially disposed in a passageway leading from a furnace chamber so as to be heated by the furnace gases. The furnace chamber is equipped with at least one fuel firing component, such as a cyclone furnace, adapted to burn an ash bearing fuel, e.g., coal, wood, and some forms of petroleum oil, all of which have slagging characteristics. The furnace gases undergo a reduction in temperature as they travel through the passageway, giving up heat to one heat exchanger after the other in passing, and depositing the ash particles entrained in the gases on the heat exchanger surfaces.

It would be advantageous to provide the heat exchangers with extended heat transfer surface, especially in downstream portions of the gas passageway, if particulate matter would not clog the restricted openings between the extended heat transfer surfaces so as to impede the flow of gas therethrough and reduce heat transfer efficiency.

According to the present invention, a heat exchanger has at least one tube row spaced upstream from the main bank of tubes so as to define a cavity between the main tube bank and the upstream tube row. The latter has extended heat transfer surfaces defining with the tube row a filter screen which spans the passageway in a plane generally normal to the direction of gas flow. With this arrangement, the entrained particles are screened from the gas stream before they can reach the main tube bank, and they are dislodged from the screen, preferably by means of soot blowers installed in the cavity between the main tube bank and the screen tube row. As a result of the soot blowers directing jets of fluid against the entrapped particles, the particles are dislodged and then reduced in size by striking the walls of the passageway and any other objects positioned in the passageway upstream of the screen tube row.

Since screening or filtering takes place on the upstream side of the main tube bank, the tubes of the main bank can be provided with extended heat transfer surfaces in order to obtain maximum heat transfer efficiency without risk of being clogged by ash, slag, or soot when an ash bearing fuel is burned in the furnace.

Various other objects, features, and advantages of the invention will appear more fully from the detailed description which follows, taken in connection with the accompanying drawings forming a part of the present application, and in which.

Figure 1:
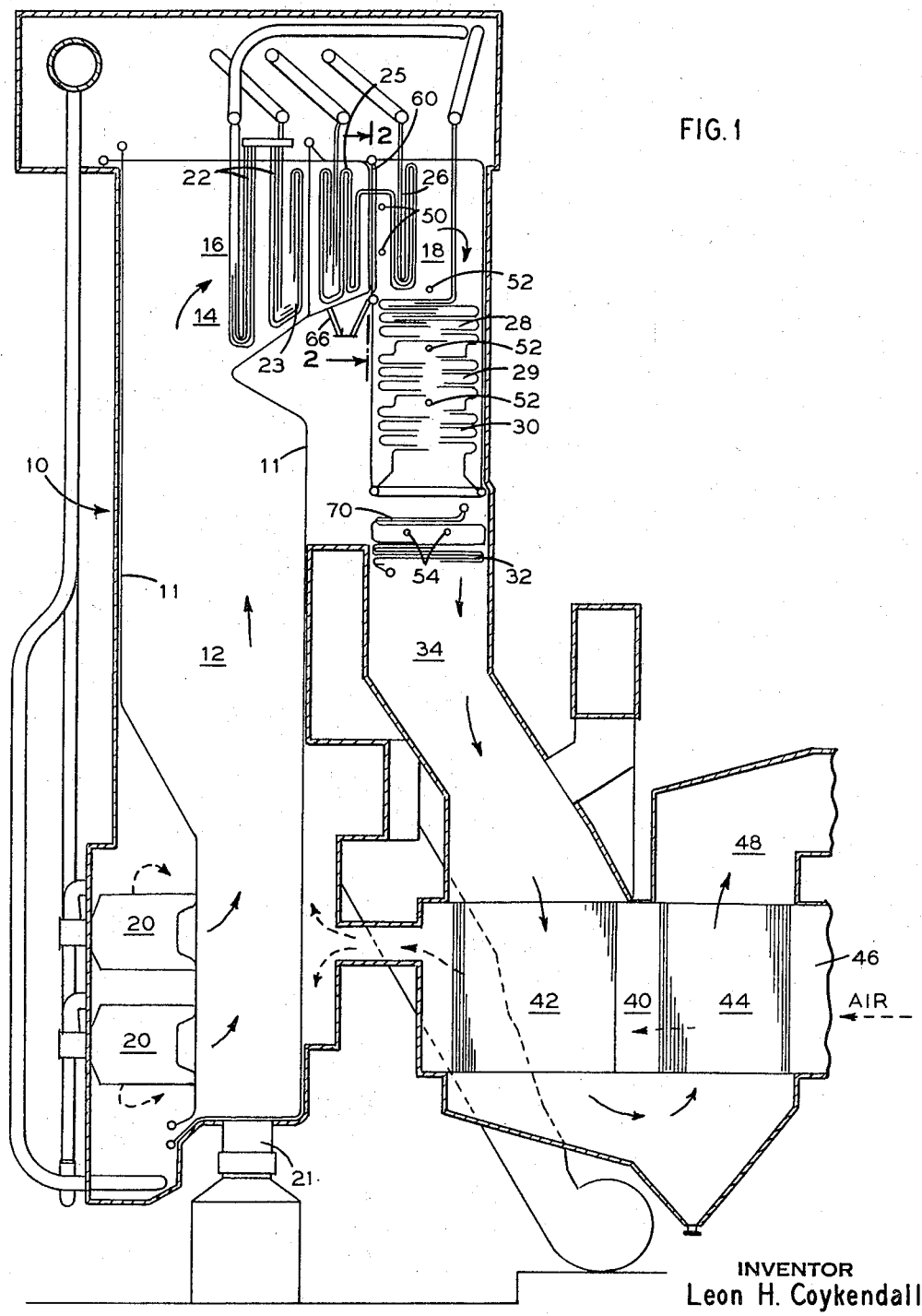
FIG. 1 is a vertical sectional view of a vapor generating and superheating unit embodying the present invention.

The invention, as illustrated in the drawings, has been applied to a vapor heating and superheating unit. Referring to FIG. 1, the illustrated unit includes wall structure 10 lined interiorly with upright tubing 11 to define a vertically elongated furnace chamber 12 having a gas outlet 14 at the top of the furnace chamber 12. The gas outlet 14 opens to a horizontally extending gas pass 16 which communicates at its other end with the upper end of an upright gas passage 18. At the lower portion of the furnace chamber 12 is a fuel firing section including horizontally extending cyclone furnaces 20 which burn ash bearing fuel and discharge high temperature gaseous products into the lower passage of the furnace chamber 12. Molten slag resulting from the fuel combustion process is discharged into a slag tank 21.

The gas pass 16 contains secondary superheater sections 22, 23 and reheater sections 25, 26 arranged in series with respect to gas flow. The gas passage 18 contains primary superheater sections 28, 29, 30 and an economizer section 32, all arranged in series with respect to gas flow. The lower end of the gas passage 18 defines a gas outlet 34 leading to a primary air heater 40. The heating of air in the air heater 40 is accomplished by the transfer of heat from furnace gases flowing downwardly through a first tube bank 42 and upwardly through a second tube bank 44 as the air entering the air heater inlet 46 flows horizontally in heat transfer relationship with the tubes of the tube banks and then on to the cyclone furnaces 20. The furnace gases are discharged to the atmosphere from an air heater gas outlet 48 through a stack (not shown).

In order to clean the heat exchanger surfaces, soot blowers are disposed at various locations in the gas passageways 16 and 18. There are soot blowers 50 associated with the reheater sections 25, 26, soot blowers 52 associated with the superheater sections 28, 29 and 30, and soot blowers 54 associated with the economizer section 32.

When combustion gases deposit slag, soot and the like on heat exchanger surfaces, the heat transfer efficiency is imparied. This must be taken into account when planning the type, spacing and arrangement of the heat exchange surfaces. Smooth surfaced heat exchanger tubing, free of fins or studs, has been employed previously in the economizer 32, for example, in order to minimize deposits, fouling or plugging.

The present invention copes with this problem so that it will be possible to have improved heat transfer efficiency. This is accomplished by locating auxiliary tubing disposed as a screen with extended heat transfer surface ahead or upstream of a main tube bank, as will be described more fully herein. Thus arranged, the auxiliary or screen tubing performs not only a heat transfer function, but also a screening function whereby solid particles entrained in the gas stream are collected thereon and dislodged from time to time by suitably placed soot blowers. Soot blowers positioned between the main tube bank and the auxiliary tubing of a heat exchanger effect forceful dislodgment and removal of accumulations from the screen tubing thus reducing some of the particles in size by causing their collision with wall and heat exchanger structure on the upstream side of the auxiliary or screen tubing. After some of the particles are reduced in size they will, on their next attempt, pass through the screen tubing, then go on through the rest of the heat exchanger, and eventually pass up the stack to the atmosphere. Where auxiliary tubing is arranged according to the invention as a screen at an acute or right angle to the horizontal in a horizontal gas passageway, however, a very substantial portion of the total ash and slag particles collected falls by gravity from the screen into a suitably positioned collection hopper from whence it can be conveniently removed without reentrainment in the gas stream. This provision is advantageous because it reduces the amount of rescreening and cleaning effort imposed upon the system.

Figure 2:
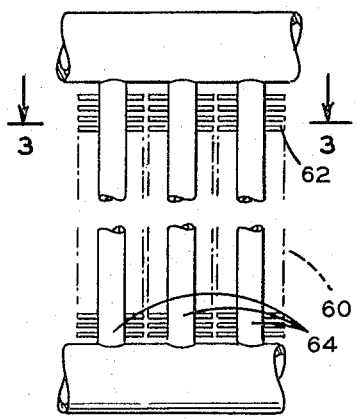
FIG. 2 is an enlarged view of a fragment of the apparatus of FIG. 1 taken as a section along line 2—2 of FIG. 1.
Figure 3:
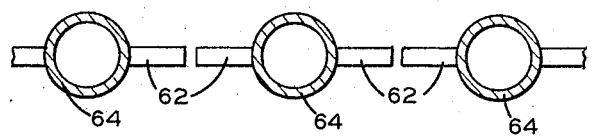
FIG. 3 is a horizontal sectional view, enlarged still further, taken along line 3—3 of FIG. 2.
Figure 4:
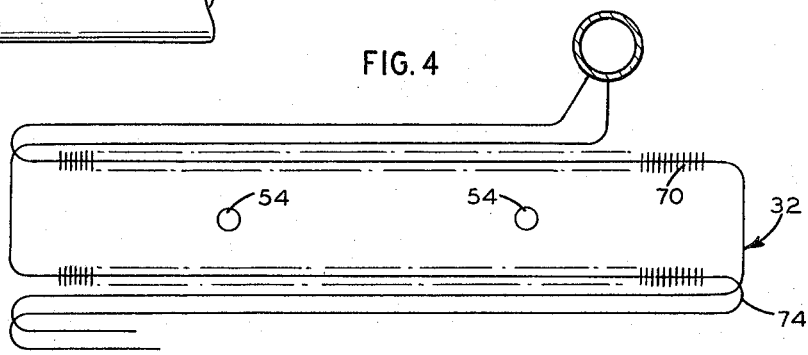
FIG. 4 is a view showing in elevation a fragment of apparatus of FIG. 1 on a greatly enlarged scale.
Figure 5:
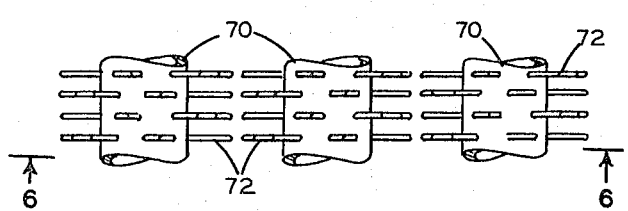
FIG. 5 is an enlarged plan view of a fragment of the apparatus shown in FIG. 4.
Figure 7:
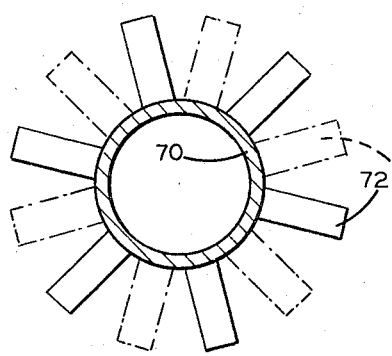
FIG. 7 is an enlarged view of a portion of FIG. 6, showing the arrangement of the heat transfer surfaces in greater detail.
Figure 6:
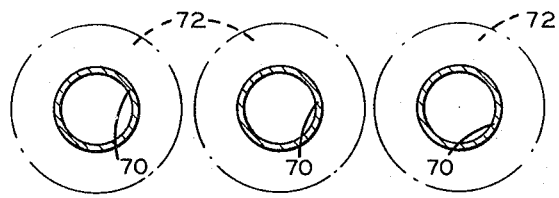
FIG. 6 is a cross-sectional view taken along line 6—6 of FIG. 5 to show the spacing of tubes and extended surfaces.

Auxiliary screen tubes can be oriented at various angular inclinations in the gas passageways, although an attitude normal to the direction of gas flow is advantageous because it occupies a minimum length of passageway. As shown in FIG. 1, for example, an auxiliary tube row 60 is vertically disposed within the horizontal gas pass 16 between the reheater sections 25 and 26, at an attitude normal to the direction of gas flow. As shown in FIG. 2, this auxiliary tubing 60 has extended heat transfer surfaces in the form of studs 62 on tubes 64 all extending in the plane normal to the direction of gas flow in order to effectively screen solid particles entrained within the gas stream from whence they fall by gravity into a collection hopper 66 at the lower end of the auxiliary tube row. Solid particles and other accumulations which do not fall by gravity into the collection hopper 66 are dislodged from the studs 62 for reentrainment in the gas stream by operating the soot blowers 50. The jets of steam or other fluid from the soot blowers 50 are directed at the auxiliary tube row 60 in upstream direction to keep the flow spaces between the studs 62 clear for the flow of gas therethrough.

Similarly, the economizer 32 is provided with an auxiliary tube row 70 of the studded tube type shown in detail in FIGS. 4, 5, 6 and 7. It will suffice to say that the studs 72 of the auxiliary tube row 70 are positioned and arranged along the length of the tube and in relation to the studs of neighboring tubes so as to provide an effective screen against solid particles carried by the gas stream toward the economizer section 32. Periodic operation of the soot blowers 54 disposed in the cavity defined by the spacing between the main tube bank 74 and the auxiliary tube row 70 on the upstream side of the main tube bank 74 directs fluid in upstream direction against tube row 70 and thus ensures that there will be free flow of combustion gases through this heat exchanger and reduction of particle size by collision and impact, just as with auxiliary tube row 60. It will be noted, however, that studded tubes providing extended surface are also employed in the main tube bank 74 in order to increase the heat transfer efficiency of the main tube bank, with the result that the economizer 32 will achieve maximum effectiveness in a minimum space for absorbing additional heat from the flue gas and adding it as sensible heat to feedwater flowing toward the boiler.

What is claimed is:

1. In a vapor generating and superheating unit, a furnace, means for burning ash bearing solid fuel in said furnace, a passageway having an inlet connected to said furnace and having horizontally and vertically extending portions, means for conducting passing gaseous products of combustion and entrained solid particles through the horizontally and vertically extending portions of said passageway, economizer heat transfer apparatus disposed in the vertically extending portion of said passageway and including a plurality of tube rows extending in horizontal direction relative to the vertically extending portion of said passageway, at least one of said tube rows including spaced tubes having extended heat transfer surfaces disposed at least partly in the spaces between the tubes of each row, said heat transfer apparatus further including auxiliary tubing spaced from said tube rows on the upstream side thereof to define a cavity therebetween and extending in horizontal direction relative to said passageway, said auxiliary tubing being provided with extended heat transfer surfaces defining flow spaces no larger than the flow spaces between tubes in any of said tube rows whereby solid particles entrained in the gas stream and flowing from said furnace downwardly through the vertically extending portion of said passageway are intercepted at said auxiliary tubing, and soot blower apparatus disposed in said cavity and adapted for operative association with said auxiliary tubing for dislodging in upstream direction any particles lodged in the flow spaces of said auxiliary tubing.

2. In a vapor generating and superheating unit, a furnace, means for burning ash bearing solid fuel in said furnace, a passageway having an inlet connected to said furnace, means for passing gaseous products of combustion and entrained solid particles through said passageway, heat transfer apparatus disposed in said passageway and including a plurality of tube rows extending in transverse direction relative to said passageway, at least one of said tube rows including spaced tubes having extended heat transfer surfaces disposed at least partly in the spaces between the tubes of each row, said heat transfer apparatus further including auxiliary tubing spaced from said tube rows on the upstream side thereof to define a cavity therebetween and extending at an acute angle to the horizontal, said auxiliary tubing being provided with extended heat transfer surfaces defining flow spaces no larger than the flow spaces between tubes in any of said tube rows whereby solid particles entrained in the combustion gas stream and flowing through said passageway are intercepted at said auxiliary tubing, and soot blower apparatus disposed in said cavity and operatively associated with said auxiliary tubing for dislodging in upstream direction any solid particles lodged in the flow spaces of said auxiliary tubing, and a hopper positioned below said auxiliary tubing to catch intercepted solid particles falling downwardly from said auxiliary tubing.

References Cited by the Examiner

UNITED STATES PATENTS

| | | | |
|---|---|---|---|
| 2,002,465 | 5/1935 | Bailey et al. | 122—235 |
| 2,198,446 | 4/1940 | Wilcoxson | 122—235 |
| 2,225,808 | 12/1940 | Tongeren | 122—235 |
| 2,444,908 | 7/1948 | Bailey et al. | 122—367 X |
| 2,835,231 | 5/1958 | Evans et al. | 122—478 |
| 2,905,154 | 9/1959 | Shaap | 122—478 |

KENNETH W. SPRAGUE, Primary Examiner.